United States Patent [19]
Rowlette

[11] Patent Number: 5,334,464
[45] Date of Patent: Aug. 2, 1994

[54] LIGHTWEIGHT BATTERY PLATES

[75] Inventor: John J. Rowlette, Monrovia, Calif.

[73] Assignee: Bipolar Power Corporation, Whittier, Calif.

[21] Appl. No.: 932,521

[22] Filed: Aug. 20, 1992

Related U.S. Application Data

[63] Continuation-in-part of Ser. No. 733,471, Jul. 22, 1991, abandoned.

[51] Int. Cl.$^5$ .............................................. H01M 2/20
[52] U.S. Cl. ...................................... 429/210; 429/245
[58] Field of Search ................................. 429/210, 245

[56] References Cited

U.S. PATENT DOCUMENTS

| | | |
|---|---|---|
| 2,564,707 | 8/1951 | Mochel . |
| 3,728,158 | 4/1973 | Poe et al. . |
| 4,037,031 | 7/1978 | Jacob ................................. 429/149 |
| 4,098,967 | 7/1978 | Biddick et al. ........................ 429/210 |
| 4,208,473 | 6/1980 | Bradley . |
| 4,275,130 | 6/1981 | Rippel et al. . |
| 4,324,848 | 4/1982 | Will . |
| 4,326,017 | 4/1982 | Will . |
| 4,353,969 | 10/1982 | Rippel et al. . |
| 4,394,613 | 7/1983 | Cole . |
| 4,405,697 | 9/1983 | Rowlette . |
| 4,422,917 | 12/1983 | Hayfield . |
| 4,507,372 | 3/1985 | Rowlette . |
| 4,510,219 | 4/1985 | Rowlette . |
| 4,539,268 | 9/1985 | Rowlette . |
| 4,542,082 | 9/1985 | Rowlette . |
| 4,547,443 | 10/1985 | Rowlette ............................. 429/217 |
| 4,603,093 | 7/1986 | Edwards et al. . |
| 4,625,395 | 12/1986 | Rowlette . |
| 4,658,499 | 4/1987 | Rowlette . |
| 4,708,918 | 11/1987 | Fitzgerald et al. . |
| 4,713,306 | 12/1987 | Pinsky et al. . |
| 4,735,870 | 4/1988 | Rowlette . |
| 4,787,125 | 11/1988 | Pinsky et al. . |
| 4,861,689 | 8/1989 | Clough et al. . |
| 4,900,643 | 2/1990 | Eskra et al. . |
| 4,908,282 | 3/1990 | Badger . |
| 4,909,955 | 3/1990 | Morris et al. . |
| 5,002,841 | 3/1991 | Belongia et al. . |
| 5,114,807 | 5/1992 | Rowlette . |

*Primary Examiner*—Stephen Kalafut
*Assistant Examiner*—M. Nuzzolillo
*Attorney, Agent, or Firm*—Anglin & Giaccherini

[57] ABSTRACT

The Lightweight Battery Plates disclosed and claimed in this patent application solve the problems encountered by previous attempts to construct practical bipolar plates for lead-acid batteries. One of the preferred embodiments of the present invention comprises a novel combination of a self-repairing substrate (12) surrounded by a lead coating (16a & 16b) resulting in a bipolar plate (10A) which is nearly three times lighter than its pure lead counterpart. Since this innovative plate incorporates a core or substrate (12) that is self-passivating under the electrical potential and highly acidic conditions found in the lead-acid battery, any pinholes, gaps, or flaws in the lead coatings (16a & 16b) are naturally resealed. Another preferred embodiment utilizes a coating of a semi-conducting metal oxide (18), such as fluorine-doped stannic oxide, on the positive side of the bipolar plate (10B) instead of lead, which further reduces the weight. Alternative embodiments may utilize aluminum or aluminum alloy substrates, which can further lighten the plate but will forfeit its self-repairing quality.

42 Claims, 11 Drawing Sheets

LEAD

Fig. 2(a)

CARBON IN PLASTIC

Fig. 2(b)

LEAD SPHERES IN PLASTIC

Fig. 2(c)

C IN PLASTIC WITH DOPED SnO2

Fig. 2(d)

LEAD, SnO2/P & C/P

Fig. 2(e)

QUASI BIPOLAR PLATE

| 16a |
|-----|
| 12  |
| 16b |

| 18  |
|-----|
| 12  |
| 16b |

| 18  |
|-----|
| 16a |
| 12  — 12a |
| 16b — 12b |

LIGHTWEIGHT BATTERY PLATES

The present application is a continuation-in-part of patent application U.S. Ser. No. 07/733,471, filed on Jul. 22, 1991, now abandoned.

FIELD OF THE INVENTION

The present invention relates to the field of rechargeable electrical batteries, and, more specifically, to a novel plate construction for use in bipolar lead-acid batteries.

CROSS-REFERENCE TO A RELATED PATENT APPLICATION

This invention provides a radically new, lightweight, low cost, "self-healing" bipolar plate design that can be used to construct a long life, high power, sealed, bipolar, lead-acid battery, such as described in my U.S. Pat. No. 4,405,697.

BACKGROUND OF THE INVENTION

Conventional Lead-Acid Batteries

Conventional lead-acid batteries generally consist of a series of separate (monopolar) positive and negative electrodes, connected in a combined series and parallel arrangement to achieve the desired voltage and current. Each electrode usually consists of a grid constructed of lead, (Pb), or a lead alloy which is filled with and covered with the active electrode material (lead dioxide for the positive electrode and sponge lead for the negative, in a fully charged battery). The purpose of the grid is twofold: to contain the active material so that the electrodes may be suspended in the sulfuric acid electrolyte solution, and to collect and to conduct the electrical current generated by the active materials, so as to be transferable to the outside of the battery. The grid is ordinarily constructed of lead (Pb) metal for four reasons:

(1) it is electrically conductive;

(2) it is resistant to corrosion in the sulfuric-acid electrolyte solution;

(3) the metal is relatively inexpensive (as compared to more resistant but unaffordable materials such as gold or platinum); and (4) it has exceptionally high gassing voltages for both hydrogen and oxygen, which minimizes the electrolytic decomposition of water in the electrolyte, and maximizes the formation efficiency of the active electrode materials (lead and lead dioxide).

The construction of conventional lead-acid batteries results in a number of problems which limit their usefulness in two important applications: electric automobiles and electric utility energy storage. The three main problems of prior lead-acid batteries are:

(1) the excessive weight required to achieve high-power discharges needed by electric vehicles;

(2) the excessive weight required to store appreciable energy; and (3) the batteries have insufficient life to be economical.

The excessive weight of lead-acid batteries is due to the extensive use of lead, one of the heaviest natural materials. The power of lead-acid batteries is largely limited by the use of a grid design to collect and conduct the electrical current, which forces the current to travel along a high resistance path thus limiting the useful power from the battery.

Bipolar Lead-Acid Batteries

The bipolar battery is fundamentally different from prior conventional lead-acid batteries described above and in which each electrode consists of a separate grid containing either the positive or negative materials, and is suspended in a battery cell. Bipolar battery construction utilizes a series of bipolar battery plates, or biplates, which are solid sheets of material, to partition the battery into cells and provide electrical contact between the positive and negative electrode materials of adjacent cells. The construction of a 6-volt bipolar lead acid battery and the differences from 6-volt lead acid conventional batteries are shown in FIGS. 1(a), 1(b), 1(c), and 1(d). The electrical current needs to pass only through the thin bipolar plates, which also serve as the physical partitions between the cells, and the electric current is thus passing through the entire battery perpendicular to the plane of each plate. This presents a very large cross sectional area and very short distance for the current to pass between cells, versus the small electrical cross section of the gird and long electrical path to the next cell which is encountered in ordinary batteries. As a consequence of these large geometrical differences between the electrical paths in conventional versus bipolar batteries, the electrical resistance in the bipolar battery is approximately one fifth of conventional batteries. With this reduction in internal resistance, a high power battery suitable for electrical automobile propulsion becomes possible, provided the battery does not have excessive weight, can be constructed at an affordable cost, and also has a sufficiently long life.

The life of previous lead acid batteries is limited by a number of failure modes, the two most common being the microscopic morphological degradation of the positive active material ($PbO_2$) and the corrosion of the lead (Pb) material used to construct the positive grids. The microscopic morphological denudation has been overcome by the use of electrically conductive glass fibers (coated with doped stannic oxide) within the active material, as described in my U.S. Pat. No. 4,507,372. The corrosion of lead however, cannot be completely overcome because of its intrinsic thermodynamic instability at the electrical potential, approximately 1.75 volts relative to hydrogen ($H_2/H^+$) found at the positive electrode in lead-acid batteries. This results in the lead slowly corroding to form lead sulfate, which is electrically non-conductive and mechanically weak. Eventually, sufficient corrosion of the lead grids in the positive electrode occurs and the battery performance degrades to a useless level. In contrast, the negative electrode grid suffers from no such corrosion because lead is thermodynamically stable at the negative electrode potential, 0.36 volts below the hydrogen electrode ($H_2/H^+$). The negative lead grid, therefore, has an indefinite life. The foregoing discussion, although referring to the lead grids used in today's monopolar batteries, is relevant to the present invention because the same operating environments are present, i.e., sulfuric-acid electrolyte and two different electrical potentials.

Figure 1A:
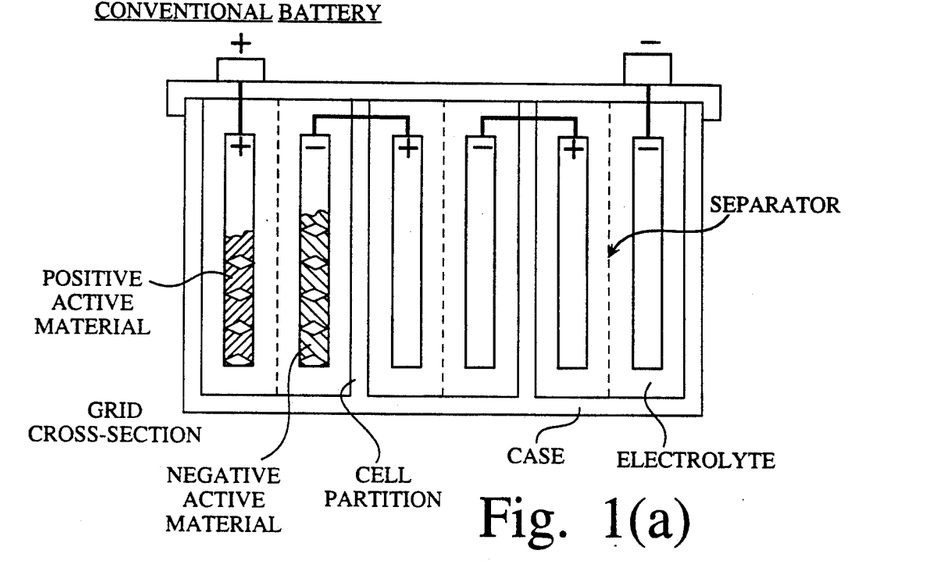
FIG. 1(a), is a schematic cross-sectional view of a conventional lead-acid battery.
Figure 1B:
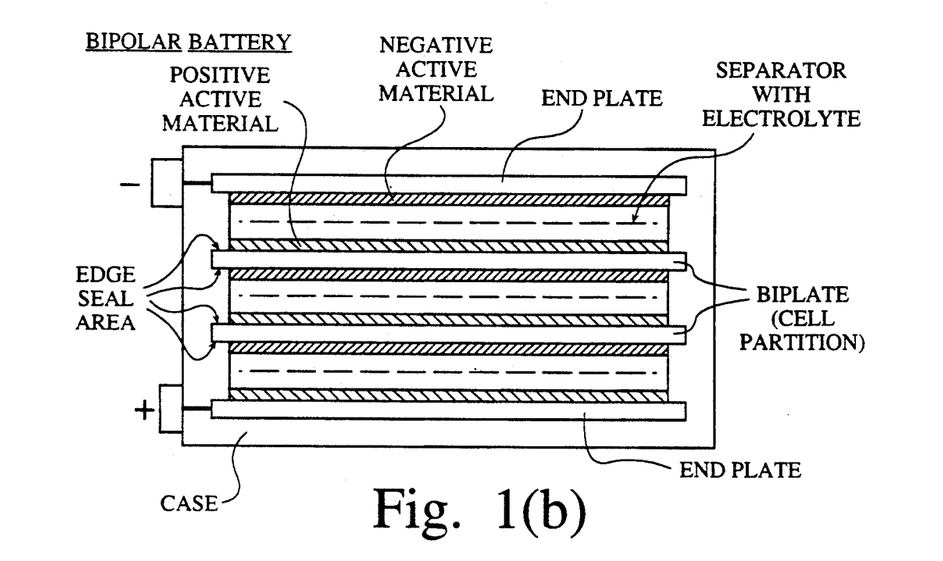
FIG. 1(b) is a schematic cross-sectional view of a bipolar lead-acid battery.
Figure 1C:
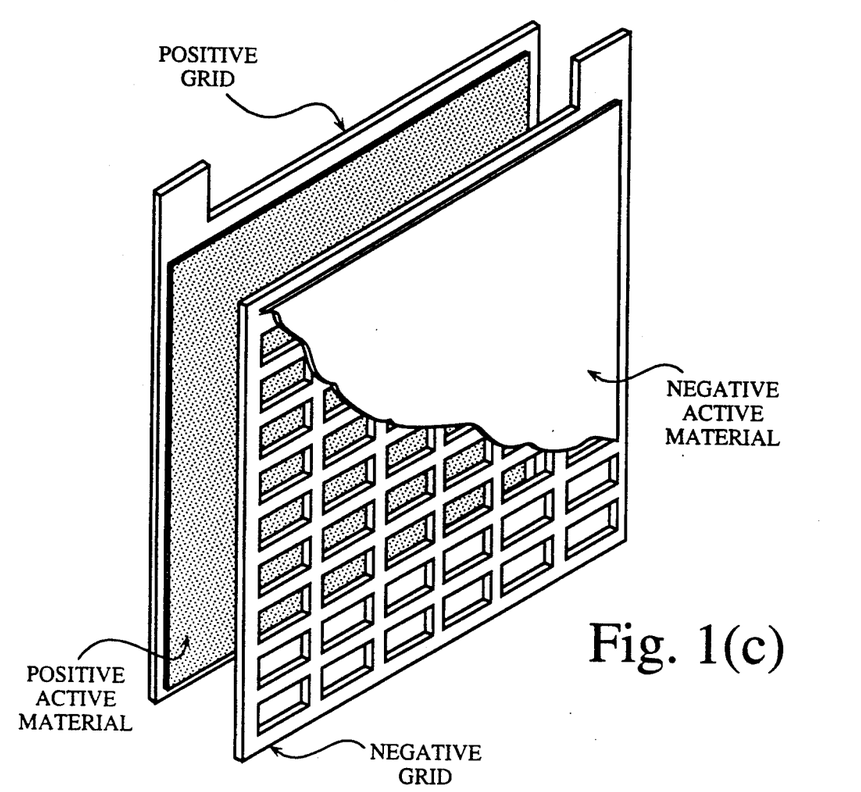
FIGS. 1(c) and 1(d) compare the structures of grids and bipolar plates.
Figure 1D:
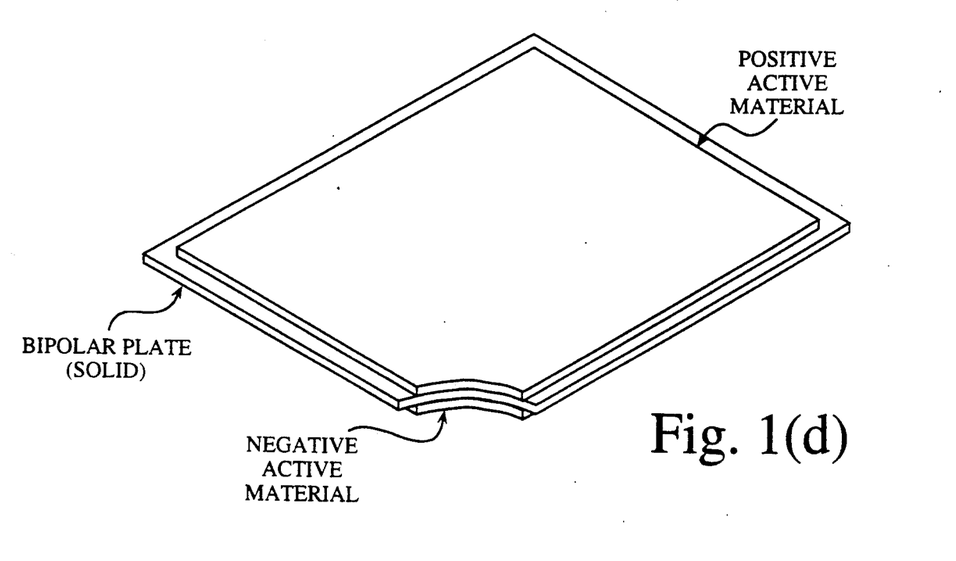
Figure 2A:
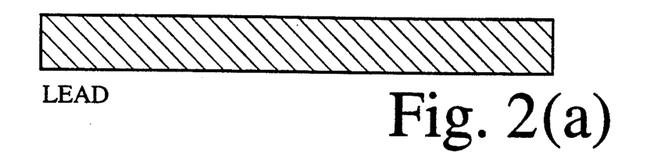
FIGS. 2(a) through 2(f) present a series of six illustrations of past approaches to the construction of bipolar battery plates. None of the dimensions presented in FIG. 2 are shown to scale.
Figure 2B:
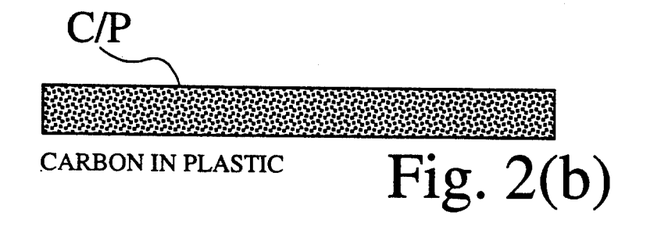
Figure 2C:
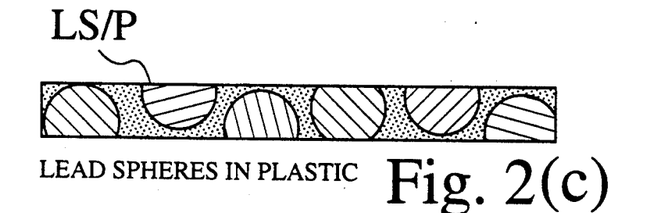
Figure 2D:
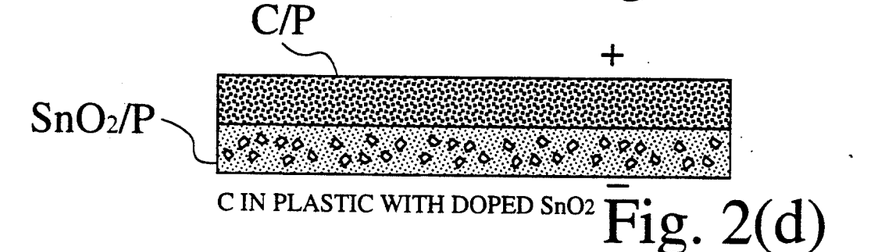
Figure 2E:
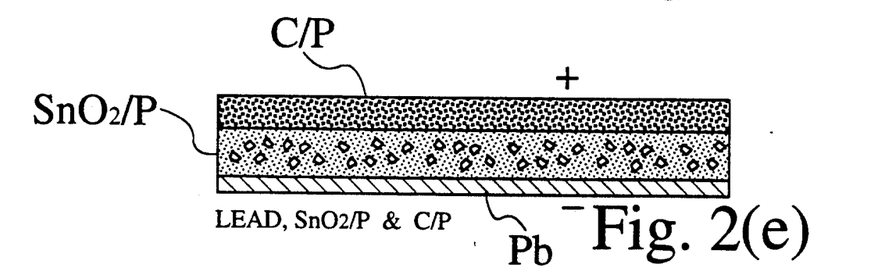
Figure 2F:
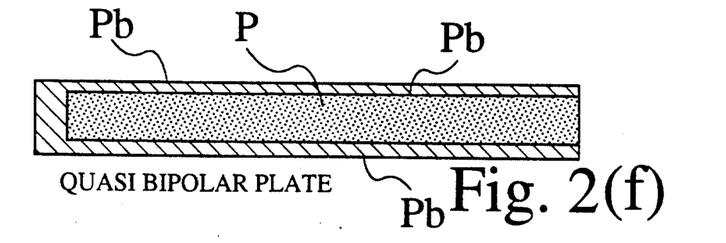

Unlike grids, however, the bipolar plate must simultaneously withstand both the positive and negative electrochemical reactions (oxidation and reduction). Therefore, the first plates used to construct bipolar lead-acid batteries were of solid lead, like their grid counterparts in conventional batteries. These bipolar plates were impractical for most applications, however, because of their heavy weight and the relentless corrosion. Eventually the corrosion will result in a perforation of the biplate. This immediately results in an electrical short between the cells, destroying cell integrity and thus degrading the battery. There have been a number of attempts to construct a practical plate for bipolar batteries some of which are shown in FIGS. 2(a) through 2(f). The first bipolar lead-acid batteries were extremely heavy because the bipolar plates, or "biplates" were composed entirely of lead, one of nature's heaviest metals. One of the greatest challenges confronting developers of the bipolar lead-acid battery has been the construction of a bipolar plate which is light-weight, but which does not achieve the reduced weight by adding more cost or by compromising power capacity or useful lifetime. Many previous attempts to overcome this challenge have met with mixed results. FIG. 2 illustrates six different types of previous biplates which are each beset by their own particular shortcomings. The first lead battery plates, pictured in FIG. 2(a), were soft and difficult to work with. Repeated charging and discharging creates corrosion first on the plate surface creating high electrical resistance and eventually to perforation of the plate, resulting in the failure of the battery. Several years ago, a carbon-in-plastic plate (C/P), like the one shown in FIG. 2(b), was developed. This hybrid plate fails quickly because the carbon oxidizes and forms acetic acid and carbon dioxide. The carbon-in-plastic plate was improved by incorporating solid lead spheres in the plastic plate, as shown in FIG. 2(c) as described in my U.S. Pat. No. 4,658,499. Later, the carbon-in-plastic plate was improved somewhat further by adding a second layer of plastic containing the same conductive glass fibers as used in the positive electrode material and described in my U.S. Pat. No. 4,507,372. The resulting combination plate is depicted in FIG. 2(d). A more complex design, which is portrayed in FIG. 2(e), adds a third layer consisting of pure lead to the double plastic plate. Yet another attempt at providing a biplate for a high-power, bipolar battery is revealed by FIG. 2(f). This apparatus, called a "quasi-bipolar plate", includes a wrapping of lead that envelopes a plastic center, in which conduction is not through the plate (as with a true biplate) but around the folded edge. Although lighter in weight than pure lead, none of these hybrid or composite biplates has proven to be as good an electrical conductor or as corrosion-resistant and reliable, or as inexpensive, as the original lead plate.

Figure 3:
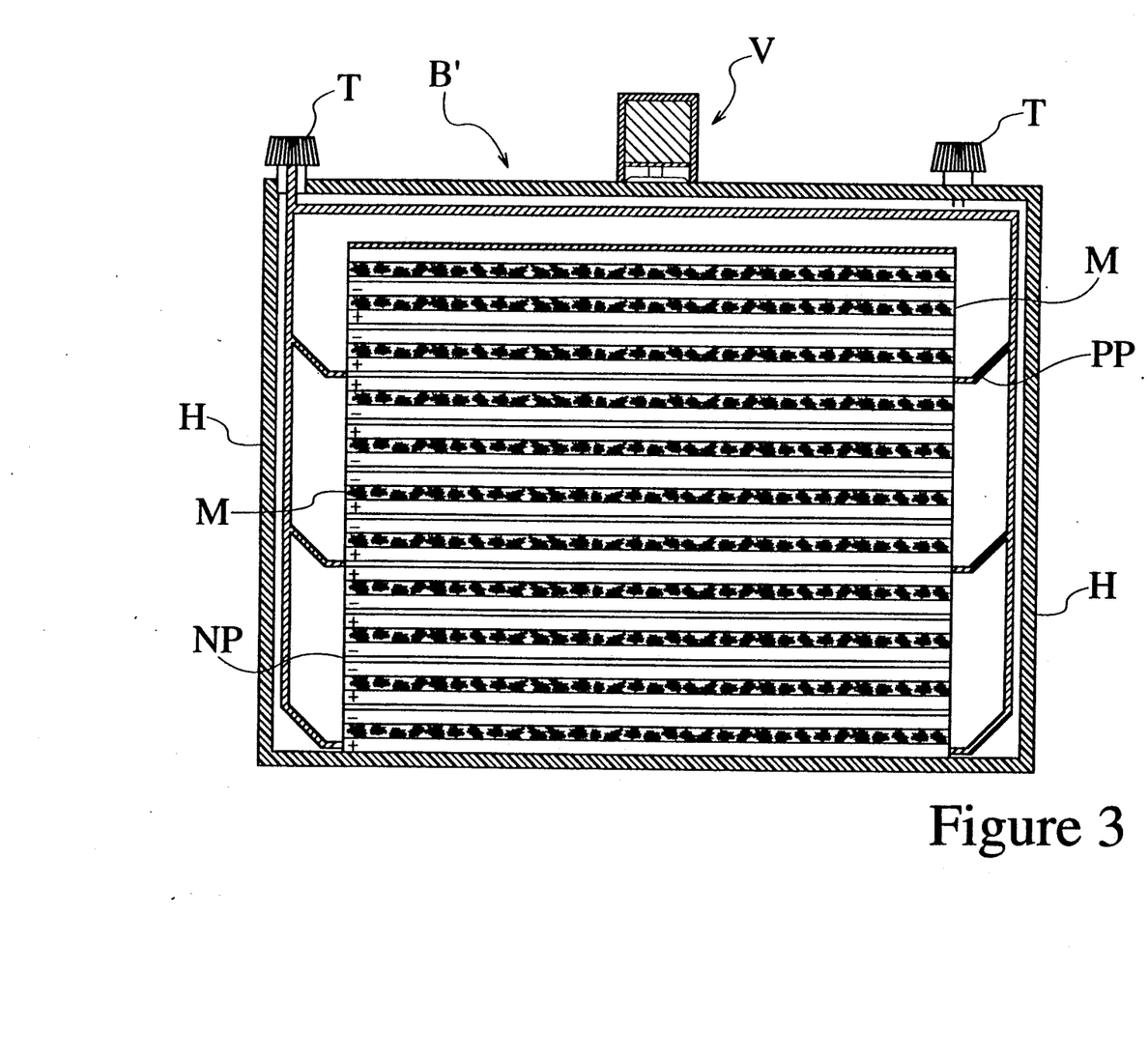
FIG. 3 is an illustration of a Sealed Bipolar Multi-Cell Battery, which is described in my U.S. Pat. No. 4,539,268.

FIG. 3 is an illustration of a Sealed Bipolar Multi-Cell Battery B', which is described in my U.S. Pat. No. 4,539,268. This low maintenance battery. B' has a pair of terminals T and a resealable vent V protruding from a housing H. The housing H encloses positive and negative plates PP and NP that are separated by fiberglass mats M. The disclosure of this patent is hereby incorporated by reference.

Figure 4:
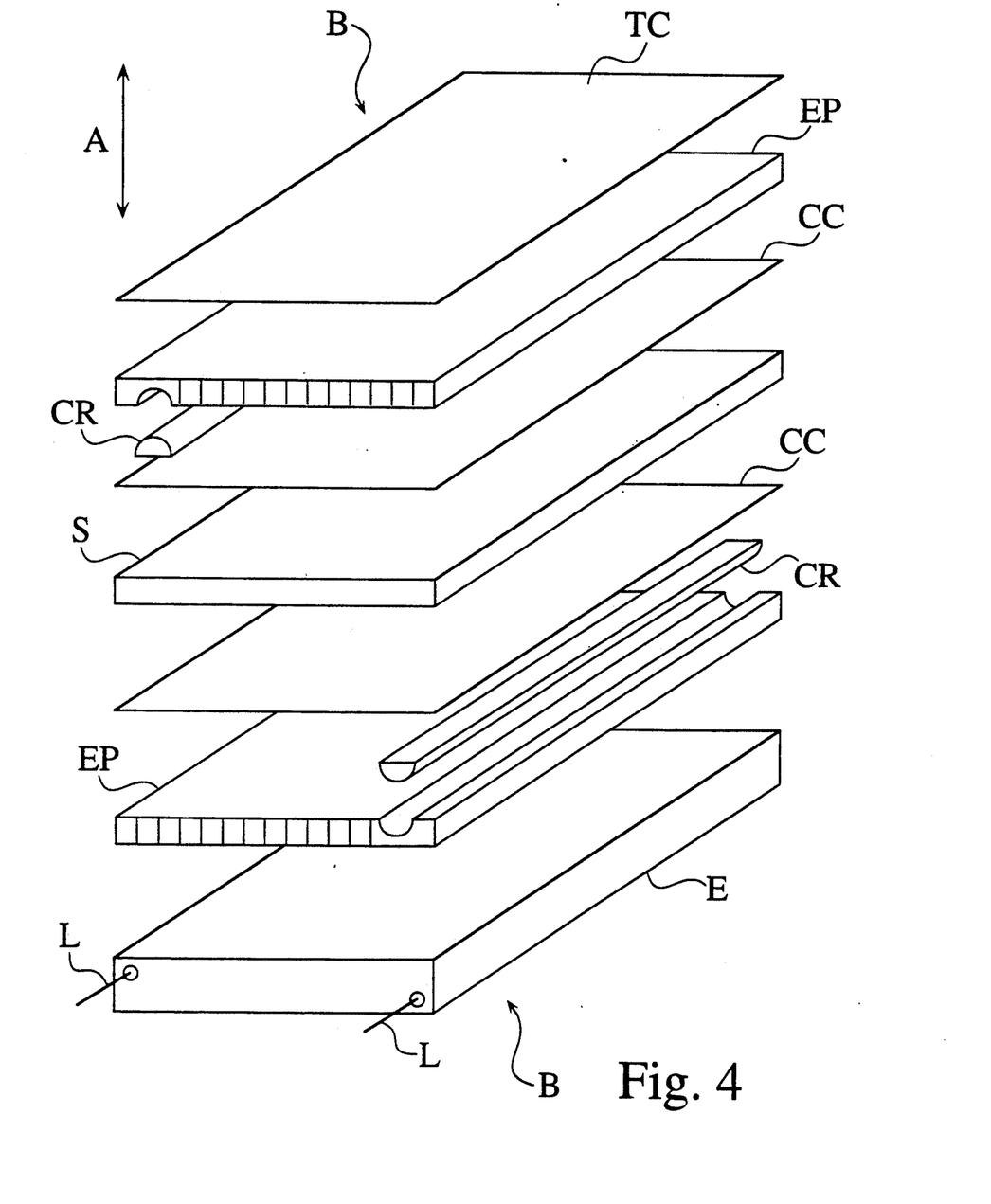
FIG. 4 provides an illustration of the stack configuration of the Lightweight Bipolar Storage Battery described in one of my previous patent applications.

FIG. 4 provides an illustration of the stack configuration of the Lightweight Bipolar Storage Battery,, which is described in my U.S. Pat. application Ser. No. 07/516,439 filed on Apr. 30, 1990. The disclosure of that patent application is hereby incorporated by reference. The exploded view in FIG. 4 shows a bipolar plate battery B which includes a top cover TC that protects an end plate EP, a current collector plate CC, and a current removing element CR. The enclosure E at the bottom of the assembly includes two leads L protruding from it and is designed to hold a similar group of elements that includes another end plate EP, current collector plate CC, and current removing element CR. All of these elements surround a central stack S of bipolar plates.

Despite all of these proposed solutions, the central goal of providing a biplate so that a powerful, lightweight, and practical bipolar lead-acid battery can be manufactured has remained elusive. The previous biplates are either expensive to manufacture, are extremely heavy, and/or susceptible to debilitating corrosion because the plates oxidize rapidly under the severe acidic and electrical environments within the battery. The practical bipolar plate must possess a combination of critical characteristics: sufficient electrical conductivity, resistance to the different corrosion mechanisms occurring simultaneously on both the positive and negative sides of the plate, light weight, and low cost. The problem of developing a biplate with these characteristics for the bipolar lead-acid battery has presented the major obstacle to its successful development and commercialization. The achievement of a light yet powerful lead-acid storage battery that would be suitable for applications such as electric automobiles would constitute a major technological advance useful in both the automotive industry and electrical power storage business. The enhanced performance that could be achieved using such an innovative device would satisfy a long felt need within the power and transportation industries.

SUMMARY OF THE INVENTION

The Lightweight Battery Plates disclosed and claimed in this patent application solve the problems encountered by previous attempts to construct practical bipolar plates for lead-acid batteries. One of the preferred embodiments of the present invention comprises a novel combination of a self-repairing substrate surrounded by a lead coating resulting in a bipolar plate which is nearly three times lighter than its pure lead counterpart. Since this innovative plate incorporates a core or substrate that is self-passivating under the electrical potential and highly acidic conditions found in the lead-acid battery, any pinholes, gaps, or flaws in the lead coating are naturally resealed.

One of the preferred embodiments of the invention comprises a thin substrate layer of iron which bears a flash coating of nickel on both of its sides. The nickel coating serves as a wetting agent which allows layers of lead to be deposited on both sides of the substrate. One of the lead layers is bounded by a protective film of a semiconductor material such as stannic oxide. Alternative embodiments may utilize aluminum or magnesium substrates, which can further lighten the plate but will forfeit its self-repairing quality.

The present invention may be used to construct an extremely lightweight and highly powerful secondary storage battery that does not suffer from the problems that plague conventional lead-acid batteries. This invention not only surmounts the manufacturing impediments and corrosion difficulties explained above in the background section, but also provides an entirely new class of mobile power supplies that will revolutionize the transportation industry. This innovative method and apparatus provide an enormously efficient storage battery that will enable auto and truck manufacturers to produce the first truly practical electric vehicles. The present invention will also supply electric utilities with an extremely efficient load leveling battery that will benefit consumers around the world.

An appreciation of other aims and objectives of the present invention and a more complete and comprehensive understanding of this invention may be achieved by studying the following description of a preferred embodiment and by referring to the accompanying drawings.

A DETAILED DESCRIPTION OF A PREFERRED EMBODIMENT

Figure 5:
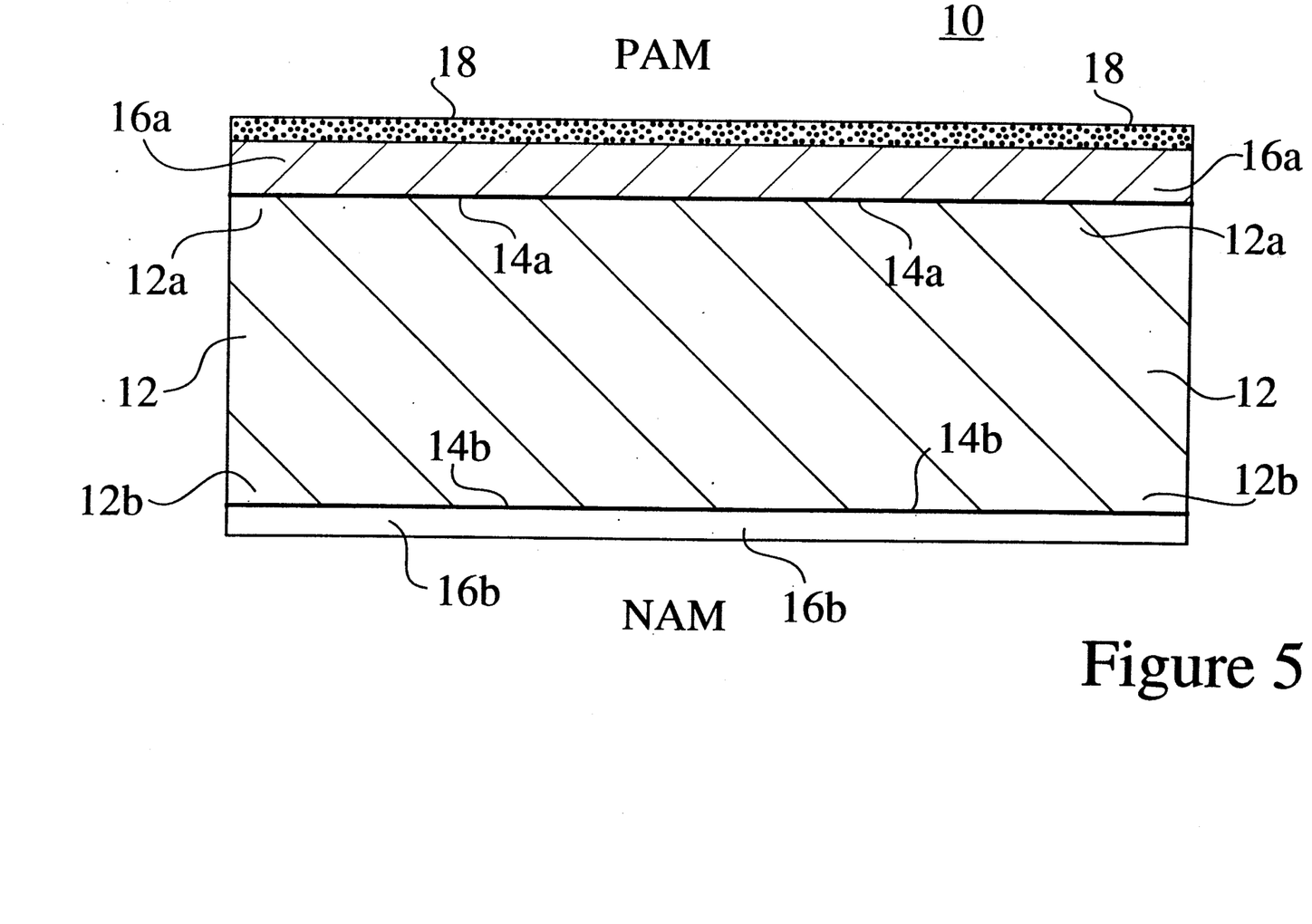
FIG. 5 exhibits one of the preferred embodiments of the present invention.

FIGS. 1, 2, 3, and 4 are discussed above in the Background section. The figures that accompany this specification are not drawn to scale. FIG. 5 supplies a cross-sectional view of the one of the preferred embodiments of the present invention. The novel bipolar plate 10 includes a substrate 12 having an upper surface 12a and a lower surface 12b. Two extremely thin layers of wetting material 14a and 14b are applied on each side of the substrate 12. An upper and a lower layer of lead 16a and 16b are deposited over the coatings 14a and 14b. The upper layer of lead 16a is protected by a layer of doped stannic oxide 18. A positive active material paste (PAM) is applied over the stannic oxide layer 18. Similarly, a negative active material (NAM) is applied over the lower lead layer 16b. In this specification, the terms "upper" and "lower" are used only to describe relative locations in the drawings and are not intended to delineate or limit the orientation of any element of the invention.

In one of the preferred embodiments, the material selected for the central planar substrate or core 12 is pure iron. The primary function of this core 12 is to provide stiffness, electrical conductivity, and mechanical support for the core 12. Pure iron is widely available, relatively inexpensive, and possesses the critical self-passivating characteristics which enable the core 12 to heal its own defects in a high potential and acidic environment. During the passivation process, initially some of the surface of the iron 12 dissolves, then a monolayer of oxide forms which is extremely stable and which precludes further corrosion. The thickness of the iron substrate is envisioned as being generally from 0.005 to 0.010 inches. Although iron is the preferred substance for the central core 12, various steel alloys may also be employed, but in situations in which battery life is of less importance. Steel may be especially useful in situations where heat treating might be utilized to fashion very stiff cores 12. Other alternatives for an even lighter substrate material include aluminum and magnesium. The substrate 12 need not necessarily be composed of a self-passivating material.

In one of the preferred embodiments, the material for the wetting agent coatings 14a and 14b is nickel. Although many other wetting agents could provide the characteristic that is required to mate layers of iron and lead, nickel appears to be an attractive candidate for one of the preferred embodiments of the invention. The wetting agent coating 14a & 14b is generally only about one to twenty micro inches thick. The lead layers 16a and 16b serve as the primary protection of the core 12 from electrochemical reaction with the sulfuric acid (not shown) which is on either side of the plates in the battery. In one of the preferred embodiments, layer 16a is about twice as thick as the second lead layer 16b. The upper layer 16a is envisioned as being about 0.0010 inches, while the lower layer 16b is about 0.0005 inches thick. The lead on the positive side 16a serves to protect the iron in the event that prolonged cell reversal destroys the stannic oxide film 18. Iron is normally passivated and would need no protection, but, under abusive conditions, the potential would go through a range in which the iron could lose its passivation. The iron would repassivate during the next recharge, but damage could result in the meantime. The lead on the negative side 16b is the best possible interface for the negative electrode. This interface has an exceptionally high hydrogen over-voltages, and since the active material is also lead, a very strong, low resistance bond is formed.

In one of the preferred embodiments, the upper or positive layer of lead 16a is covered by a protective coating 18 of conductive stannic oxide. Even though the positive layer of lead 16a experiences a relatively low corrosion rate, the stannic oxide covering 18, which is thermodynamically stable and which does not corrode, provides an additional measure of durability and eliminates the high resistance interface from lead corrosion. Although a layer of lead 16a is not strictly necessary to protect the positive side of the substrate 12a, and because of the possibility of abusive battery discharge conditions, a coating of lead on the positive side of core 12 may be optimal for the most durable construction of the core 12. In large part, the integrity provided by the semiconductor material covering 18 permits the use of virtually any thin substrate material 12. In the alternative, other materials besides stannic oxide may be used, including non-stoichiometric titanium oxide.

The present invention provides a practical, lightweight, and low cost bipolar plate 10 for bipolar lead-acid batteries by use of a composite construction. The novel design features include:

(1) a central planar substrate or central plate 12 which has the necessary structural support and electrical conductivity;

(2) an electrically-conducting protective coating 16a on the positive side of the core 12 which is resistant to the positive potential (oxidizing) electrochemical environment: and (3) an electrically conducting protective coating 18 on the negative side of the core 12 which is resistant to the negative potential (reducing) electrochemical environment.

The center core 12 material should be adequately stiff for easy manufacture. This property may be characteristic of the material itself or may be achieved by the addition of stiffening ribs within the material cross section or externally attached plastic ribs. The central core 12 must also possess an electrical conductivity of at least 1.0 $ohm^{-1} cm^{-1}$. Many common materials meet these requirements and include common steel and aluminum. A thickness of 0.005 to 0.010 inch thick is envisioned to be the most practical, but the thickness could vary from 0.001 to 0.100 inch. The center core 12 material can be any metal, conductive plastic, or composite material having the characteristics described above, but a special and most desirable class of materials will be those which demonstrate an additional important characteristic: self-healing when exposed to the acid electrolyte and potential. This is important for economical manufacturing and application to prevent any slight imperfection in the protective coating 16a & 16b (e.g., a pinhole or scratch) from resulting in the corrosion and perforation of the biplate 10 and thus failure of the battery. Immediate corrosion and perforation would occur for most common metals such as steel or aluminum if there were a pinhole imperfection in the protective coating material. A "self-healing" material is one which forms a stable protective film if a defect or scratch in the coating exposes the material inside the coating to the electrochemical environment. The most notable and preferred of these is pure iron or very low carbon content steel (decarburized steel) and one of the preferred embodiments is decarburized steel with a carbon content of 0.003%. This material is readily available and relatively inexpensive. Other materials possessing some degree of "self-healing" ability include titanium and some aluminum alloys, but are not as robust or as inexpensive as iron. Iron and steel are normally considered by the battery industry to be unsuitable for use in lead-acid batteries because ferrous materials promote self-discharge of the battery. This is the result of a ferric/ferrous couple which provides a "shuttle" mechanism. Ferric ion ($Fe^{+3}$) oxidizes the active lead at the negative electrode and is reduced to ferrous ion ($Fe^{++}$). The $Fe^{++}$ then migrates to the positive electrode where it reduces the $PbO_2$ and is re-oxidized to $Fe^{+3}$, and the process repeats. The net result is the self-discharge of the battery.. Trace amounts of ferric/ferrous ions, however, can be tolerated in the electrolyte solution without noticeable effects on battery performance or self-discharge. Although it is universally recognized that iron corrodes rapidly when exposed to sulfuric acid and therefore unsuitable for lead-acid batteries, it has not been generally recognized that when a positive potential is applied to the iron greater than about +1.0 V above $H_2/H^+$, the iron forms a passivating film of iron oxide which protects the iron from further corrosion. This "self-healing" effect in a lead-acid battery environment thus makes this material particularly useful as a center core 12 in bipolar batteries, since it is significantly lighter, stronger, and less expensive than lead.

Figure 6A:
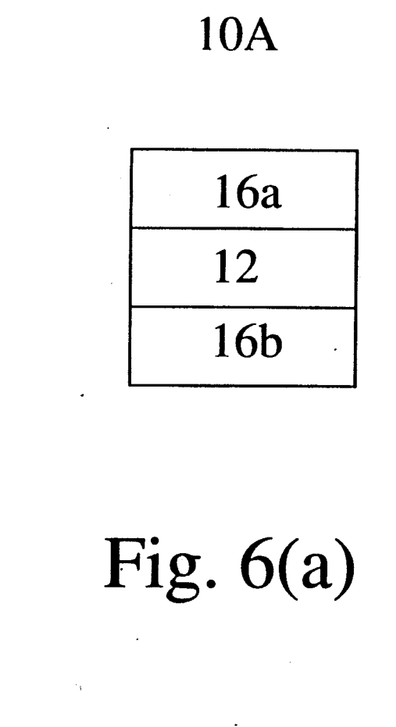
FIGS. 6(a), (b), and (c) depict some of the basic alternative embodiments of the invention.
Figure 6B:
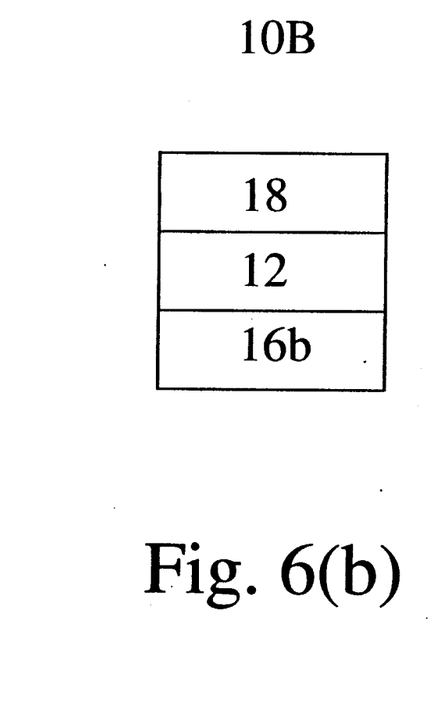
Figure 6C:
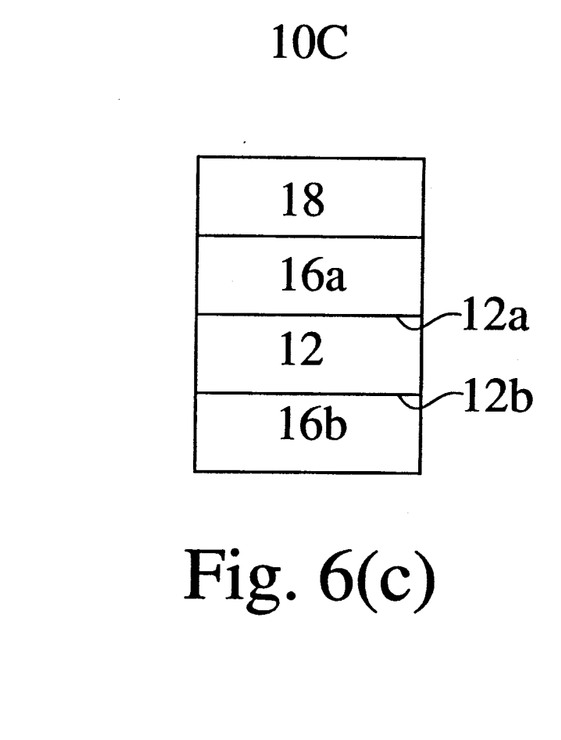
Figure 7A:
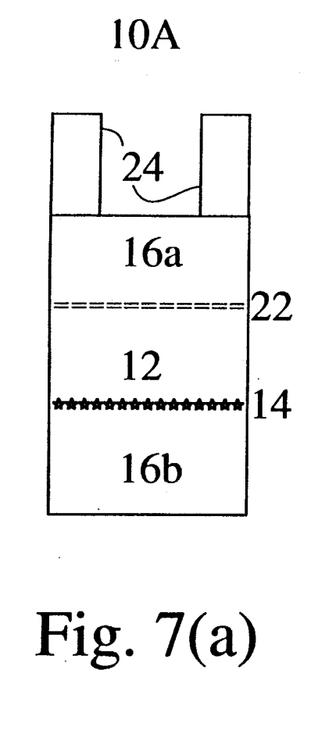
FIGS. 7(a), (b), and (c) depict some of the basic alternative embodiments of the invention that also include additional optional features.

FIGS. 6(a), (b), and (c) depict some of the basic alternative embodiments of the invention. FIGS. 7(a), (b), and (c) depict some of the basic alternative embodiments of the invention that also include additional optional features.

Figure 8:
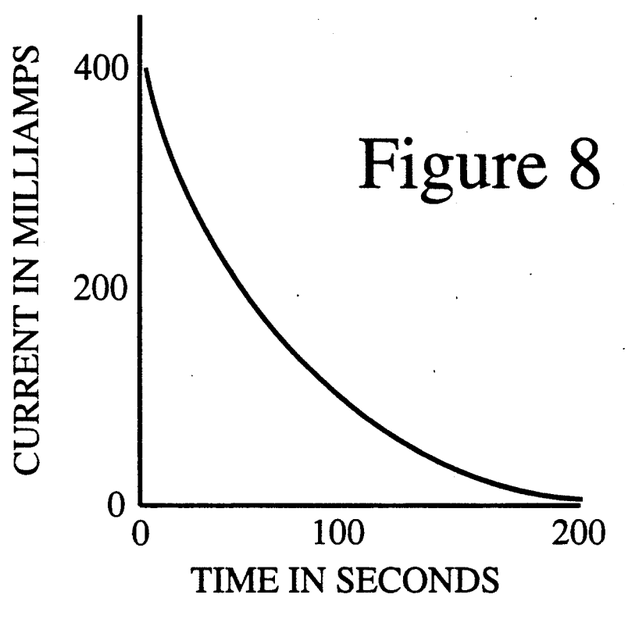
FIG. 8 is a graph of current versus time which exhibits the passivation effects on iron exposed to sulfuric acid.

This "self healing" passivation effect can be seen in FIG. 8, which shows the corrosion current (in milliamps) on exposed iron falling to substantially zero within 3 or 4 minutes after emersion in 30% between sulfuric acid with a potential of 1.75 V (above hydrogen) applied for 0.6 $cm^2$ of exposed surface area of pure iron plate. After exposure to this environment a very impervious $Fe_3O_4$ film is formed which is highly insoluble and non-oxidizable. The iron oxide, which is ordinarily an insulator, remains conductive because of the very low thickness, which has been shown to be only one monolayer. Electron flow by tunneling (a process by which electrons can "jump" across a short gap) can therefore occur. The use of iron as the central core 12 material is thus ideal because of its "self-healing" properties which have been heretofore unrecognized and unused in the battery art. The protective coating on the negative side 16b of the central core 12 can be of any material that does not add significantly to the total weight of the final biplate 10 and that can withstand sulfuric acid in the electrical potential (−0.3 to −0.4 V versus $H_2$) present on the negative side of the core 12. This protective coating 16b must also have a high hydrogen over-voltage so as to prevent gassing. The coating 16b must also have a sufficient electrical conductivity (at least 100 $ohm^{-1} cm^{-1}$) and must be capable of being applied to the center core 12 material, either alone, or in conjunction with, an intermediate ultra-thin layer of material 14a & 14b. The simplest, cheapest, and most effective protective material is a layer of lead. The lead can be applied by a variety of methods including hot-dipping and electroplating, as is commonly done on metals, or also by vapor deposition which is done on materials which cannot be readily electroplated. In the case of lead plated on an iron central core 12, an ultra-thin "flash" coating (5 to 50 micro-inches thick) of another metal (e.g., nickel) can be applied prior to the lead plating to aid in adhesion. Because lead is thermodynamically stable on the negative side of the core 12, it does not corrode and therefore the coating can be quite thin, 0.0005 inches being more than adequate. Many other metals and graphite could be used to coat the negative side of the core 12 but lead is to be preferred because of its very high hydrogen over-voltage and also because of the tight mechanical and electrical interface which is formed with the negative active material, which is also lead, but in a sponge form.

Figure 9:
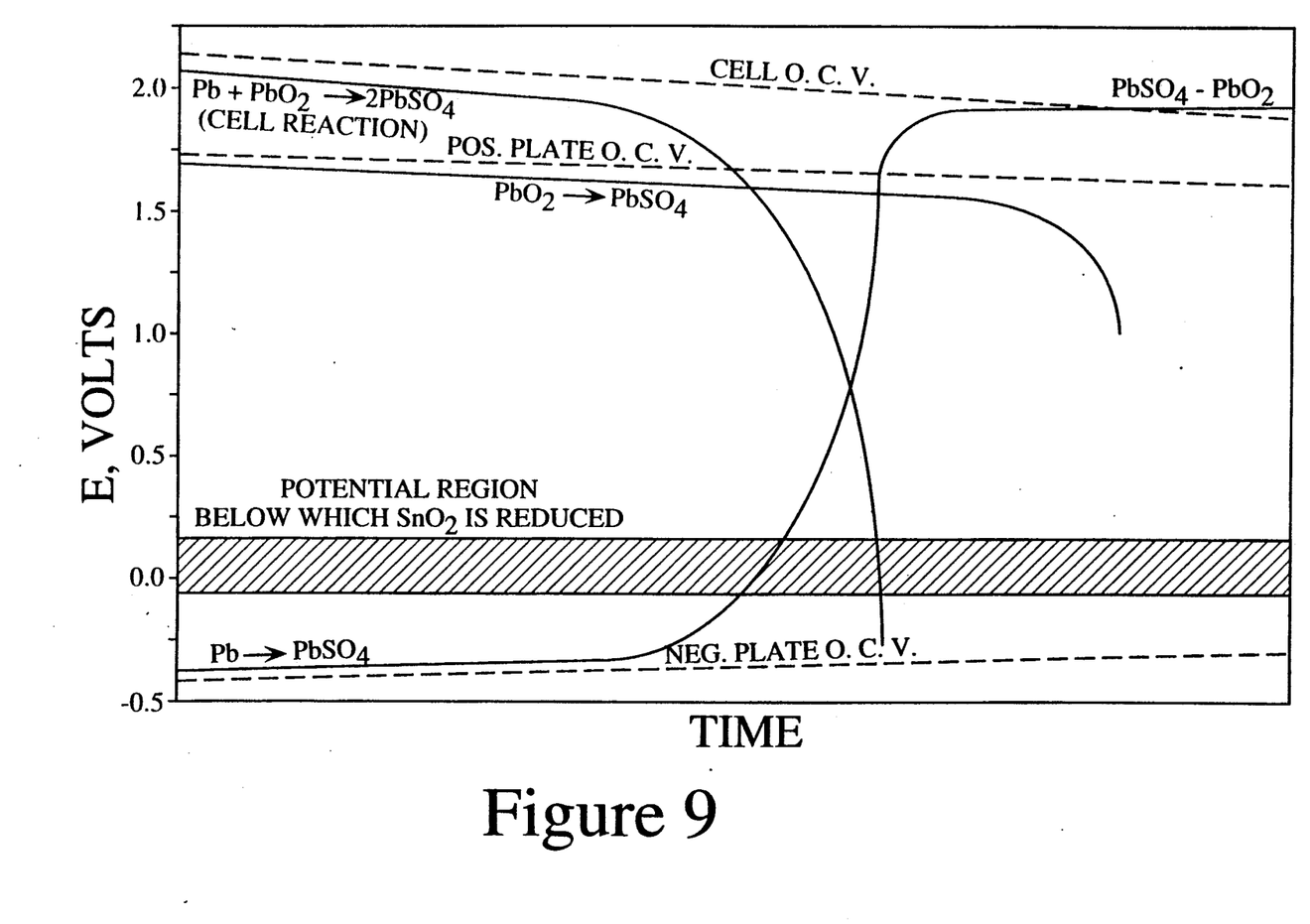
FIG. 9 furnishes a set of graphs of voltage versus time showing various chemical reactions in the battery environment.

The protective layer 18 on the positive side of the central core 12 can be of any material which does not add significantly to the weight of the central core 12 and which has reasonable corrosion resistance to the acid environment and electrical-potential (above 1.0 V) on the positive side of the core 12. The protective layer 18 must also have sufficient electrical conductivity (at least 0.01 $ohm^{-1} cm^{-1}$), and be capable of being applied to the central core 12, either alone or in conjunction with an intermediate layer. The protective coating on the positive side of the core 12 should either be thermodynamically stable or else degrade very slowly so as to yield a useful battery life. The environment on the positive side of the core 12 is highly destructive to most materials because of the highly corrosive and highly oxidizing conditions present simultaneously. No known elements, including gold, are thermodynamically stable. Even many semiconducting metal oxide materials are not thermodynamically stable (e.g., as $Ti_4O_7$) although they degrade slowly enough to be useful. The preferred coating material for the positive side is conductive stannic oxide ($SnO_2$). The stannic oxide is doped with 0.5 to 5% fluorine to provide adequate electrical conductivity, and is known to persons ordinarily skilled in the art. Doped stannic oxide is thermodynamically stable in the battery environment as shown in FIG. 4, and as shown in my U.S. Pat. No. 4,507,372 whereto the material is used successfully within the positive active material itself. Dopants other than fluorine have been used to dope stannic oxide in the past, most notably antimony, but have been found to be unsuitable because of chemical instability. Fluorine, however, has been found to be stable and was employed successfully as the dopant for the $SnO_2$ coated glass fiber described in my U.S. Pat. No. 4,507,372. Stannic oxide is an ideal material for positive side coating because lead ions (from the lead-dioxide) have been shown to penetrate about 20 Angstroms into the $SnO_2$ surface, thus creating an ideal low-resistance interface. An intermediate layer can be added between the protective coating on the positive side and the center core 12 to aid the adhesion of the protective coating to the central core 12, and/or to provide an additional protective coating in the event that a cell reversal occurs. In a cell reversal, which can result from abusive battery discharge conditions, the 1.75 V positive potential can change to $-0.3$ V negative for a period of time, as indicated in FIG. 9. Although $SnO_2$ is thermodynamically stable at positive potentials it will be chemically reduced during cell reversal and thus destroyed. Although this process requires several hours of abusive conditions, the insertion of an additional protective layer between the $SnO_2$ and core 12 would prevent an initial attack on the central core 12 should this occur. This intermediate material can be any material which offers a measure of protection in both positive and negative potentials, is conductive, and adheres to both the core and coating. One of the preferred embodiments of the invention employs lead. Lead is particularly desirable for the intermediate layer because it is also the ideal material for the protective coating on the negative side of the biplate, and thus could be applied to both sides by the same process (e.g., electroplating or hot dipping) and in a single manufacturing step. The thickness of the intermediate lead coating is envisioned as being in the range of 0.001 to 0.002 inches thick for the best combination of performance and weight. The stannic oxide coatings can be applied by a variety of methods. For biplate designs incorporating an intermediate layer of lead between the center core 12 and stannic oxide coating, physical vapor deposition, sputterings, or arc flame spraying are possible. For biplates which do not have a lead intermediate layer, the stannic oxide 18 can also be applied by dispersion coating or electrophoresis followed by firing in an oxygen free oven. The stannic oxide can also be deposited on the center core 12 by chemical vapor deposition if the center core 12 is protected from rapid oxidation by either a protective intermediate layer (e.g., a very thin flash of silver) or by an inert gas reaction.

Figure 10A:
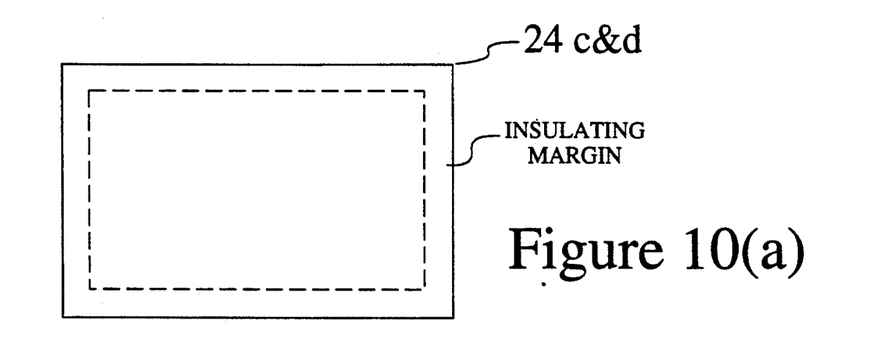
FIGS. 10(a), 10(b), and 10(c) illustrate an insulating margin for edge seal bond protection.
Figure 10B:
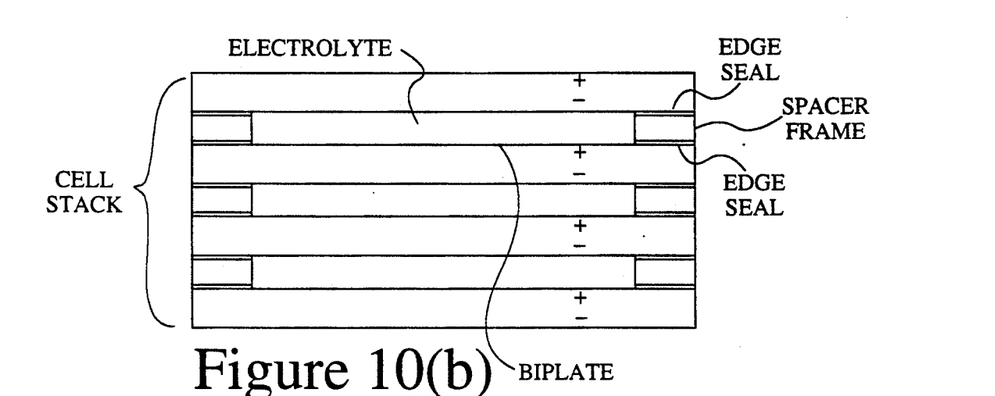
Figure 10C:
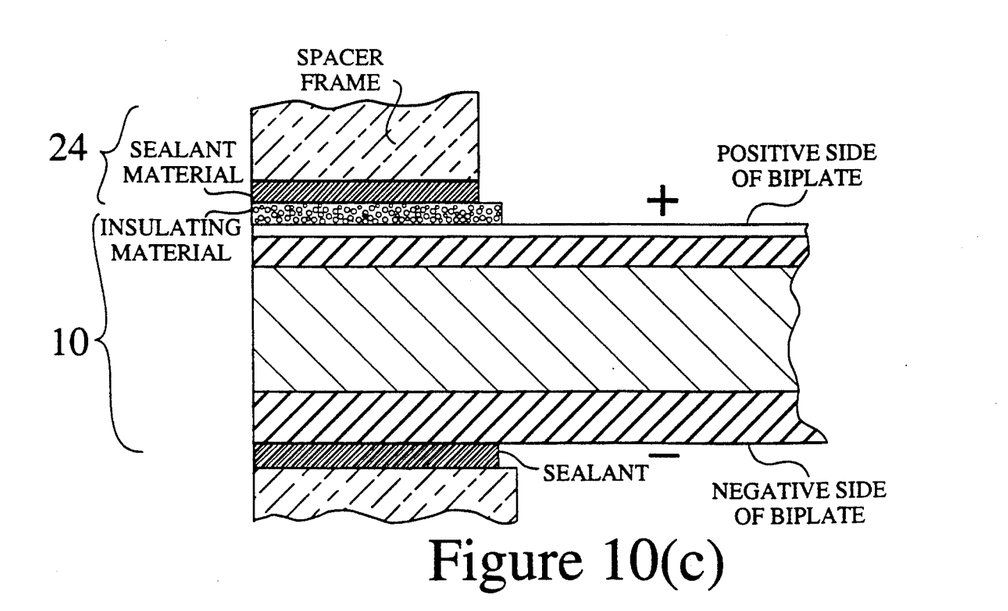

An important further refinement of the protective coating 18 or 16a on the positive side of the biplate is to provide an additional margin of non-conductive material around the edge of the battery 10 wherever the layers 16a or 18a would be in contact with the cell edge seal material. These features are illustrated in FIGS. 10(a), (b), and (c). Maintaining a leak-proof edge seal is critical to obtaining a long battery life because leakage of electrolyte will eventually result in shorts between the cells. Without this insulating margin, the seal material will be exposed to both the corrosive sulfuric-acid electrolyte and, wherever the seal directly contacts the conductive protective layer 16a or 18a on the positive side of core 12, will simultaneously be exposed to the oxidizing voltage potential. Just as no metallic elements and few metallic oxides can withstand this environment for long, there are also very few seal materials which are resistant to this environment. Notable exceptions are teflon and other fluorocarbons, which unfortunately, are also difficult to bond. Common seal materials such as epoxies, urethanes, and elastomers are not thermodynamically stable and, where exposed to this environment, will all eventually oxidize, degrade, and leak. By applying an insulating margin around the edge of the core 12, these common seal materials can be used successfully because they no longer are exposed to the destructive oxidizing electrical potential, and need only to tolerate the long-term exposure to the acid electrolyte environment. Thus, an alternative embodiment of the invention utilizes a material used in the margin around the edge of the biplate 10. The material is an insulator (conductivity less than $10^{-7}$ ohm$^{-1}$ cm$^{-1}$), which resists both the sulfuric acid electrolyte and the negative 1.75 volt oxidizing potential, and which is capable of being applied in a thin layer around the edge of the biplate wherever the biplate is in contact with the edge seal material. In general, it is envisioned that these insulating materials will be ceramics (i.e., non-conductive metal oxides) including but not limited to (undoped) stannic oxide or aluminum oxide. The application methods can be by vapor deposition (e.g., for stannic oxide), plasma spraying, or porcelainizing (as is commonly done on steel in the manufacture of household appliances). The thickness of the insulating material can be very thin (one micron) for vapor deposited coatings, to very thick (e.g., 0.030 inch) for fired porcelain edges.

In one of the preferred embodiments, the edge seal material would be undoped stannic oxide vapor deposited within the same equipment as used to apply the doped stannic oxide coating to the center core 12. To deposit the undoped material on only a narrow margin (e.g., ¼ to ½ inch) around the core 12 edge, the center of the core 12 is masked during the final deposition step of the insulating material. The embodiment is shown schematically in FIG. 10. In the case where porcelain is applied to the core 12 edges, application can also be confined to the edges by either masking or edge dipping prior to firing. Whichever method is used to achieve the insulating margin, and whatever the design of the accompanying edge seal (i.e., a discrete seal bonded between biplates using epoxy or "caulking" between the plates with an elastomeric sealant) the objective remains the same: insulate the edge sealant material from the destructive oxidizing potential present on the positive side of the biplate and thus extend the useful life of the seal and thus of the battery.

Figure 7B:
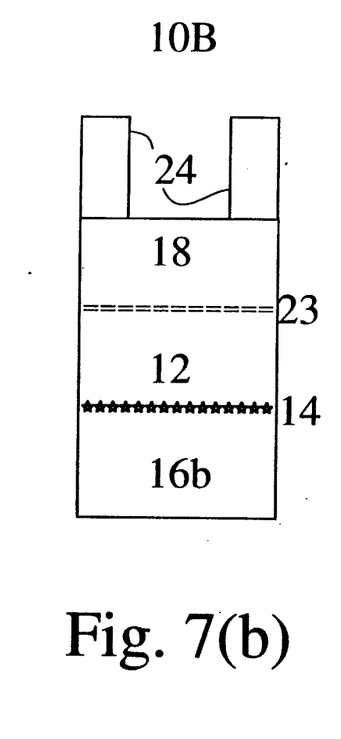
Figure 7C:
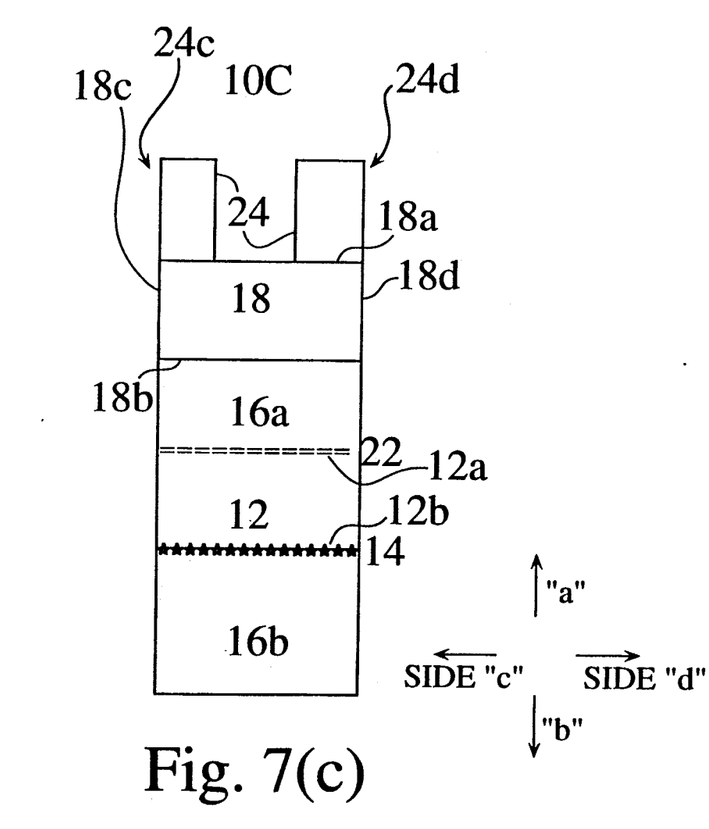

Although a number of different biplate coating materials and ranges of thickness have been described, it should be recognized that the optimum biplate design will depend on the battery application. In some applications, such as electric automobiles, power and weight are more important than, for example, in utility-company electrical energy storage where life and cost may be the paramount considerations. For applications like emergency power storage, where the battery will not be cycled extensively and be on "float" charge, the stannic oxide coating can be omitted and the positive and negative side protective coatings can both be plain lead. The optimum combination of materials, coatings, and thickness must thus be selected for each application. Examples of alternative coating and materials combinations to construct biplates are shown in FIG. 7. The construction of the biplate described in the present application is also applicable to the construction of each of the two end-plates in the stack of cells in a bipolar battery. The construction methods can also be applied to the final plate at each end of the stack of cells, which will be either positive or negative. The end-plate-and-current-collector design is described in detail in my U.S. Pat. application Ser. No. 07/516,439 filed on Apr. 30, 1990.

Summary of a Design Example

The current embodiment of a bipolar plate design based upon the present invention and as currently envisioned for electric automobiles is as follows: a center core 12 of iron 0.005-inch thick, coated on the negative side with 0.0005-inch thick pure lead electroplated onto the core 12 by the aid of a 20 microinch flash of nickel between the lead and iron, and coated on the positive side with a protective coat of fluoride-doped stannic oxide 2 microns thick. This embodiment is shown schematically in FIG. 7. In addition, a final non-conductive (undoped) layer of stannic oxide is applied on the positive side in a 0.5 inch-wide strip around the edge of the biplate to form an insulating margin for the battery-cell edge seal area. The advantages of this embodiment over the past approaches to constructing a bipolar plate, in terms of weight, conductivity, and cost, can be seen in Table 1:

TABLE 1

Comparison of the Present Invention and Previous Concepts for Bipolar Plates in a 48-Volt 50 Amp-hour example battery

| FIG. NO. | Plate Construction | Approx. plate thickness (mm) | Total Weight of plates in 48V battery (kg) | Approx. area-resistance of plate (ohms/cm$^2$) | Approx. cost of plate mat'ls. ($) |
|---|---|---|---|---|---|
| 2a | Pure lead sheet | 0.41 | 16.8 | $<10^{-6}$ | 15 |
| 2c | Plastic sheet embedded lead spheres | 1.0 | 5.0 | $<10^{-5}$ | 10 |
| 2e | Carbon, SnO$_2$ fibers plastic composite, lead | 1.0 | 11.7 | 0.1 | >170 |
| 5 | Present invention: SnO$_2$, iron, Pb composite | 0.18 | 4.0 | $10^{-7}$ | 10 |

Although the present invention has been described in detail with reference to particular preferred embodiments, persons possessing ordinary skill in the art to which this invention pertains will appreciate that various modifications and enhancements may be made without departing from the spirit and scope of the claims that follow.

What is claimed is:

1. A battery plate apparatus (10C) for use in a sealed bipolar lead-acid battery comprising:

a layer of iron (12) which is self-healing in an acidic environment; said layer of iron (12) having an upper (12a) and a lower (12b) side;

a discrete thermodynamically instable positive side protective layer of lead (16a) which protects said central layer of iron (12) from a destructive electrochemical reaction;

said discrete thermodynamically instable positive side protective layer of lead (16a) being located adjacent to said upper side (12a) of said central layer of iron (12);

said discrete thermodynamically instable positive side protective layer of lead 16a having an upper and a lower side and a first and a second lateral end;

a discrete thermodynamically stable positive side protective layer of fluorine-doped conductive stannic oxide (18);

said discrete thermodynamically stable positive side protective layer of fluorine-doped conductive stannic oxide (18) being located adjacent to said upper side of said discrete thermodynamically instable positive side protective layer of lead (16a;)

said discrete thermodynamically stable positive side protective layer of fluorine-doped conductive stannic oxide (18) having an upper (18a) and a lower (18b) side and a first (18c) and a second (18d) lateral end;

a discrete negative side protective layer of lead (16b);

said discrete negative side protective layer of lead (16b) being located adjacent to said lower side (12b) of said layer of iron (12) and having a high hydrogen over-voltage;

said layer of iron (12) which is self-healing in an acidic environment being capable of forming a stable protective film over itself if a defect in either of said discrete protective layers of lead (16a, 16b) exposes said layer of iron (12) to said acidic environment;

a wetting agent layer of nickel flash (14) for providing plating compatibility; said wetting agent layer of nickel flash (14) being generally located between said lower side (12b) of said layer of iron (12) and said negative side protective layer of lead (16b); said wetting agent layer of nickel flash being generally from one to twenty micro-inches thick;

a first intermediate layer of lead (22) for protecting said layer of iron (12) during a charge reversal of said sealed bipolar lead-acid battery (10); and a nonconductive seal (24) for insulating said thermodynamically stable positive side protective layer of fluorine-doped conductive stannic oxide (18) from external electrical potentials;

said nonconductive seal (24) being located adjacent to said upper side (18a) of said thermodynamically stable positive side protective layer of fluorine-doped conductive stannic oxide (18);

said nonconductive seal (24) including a pair of insulating margins (24c, 24d);

said pair of insulating margins (24c, 24d) being located near said first (18c) and said second (18d) lateral ends of said upper side (18a) of said thermodynamically stable positive side protective layer of fluorine-doped conductive stannic oxide (18); and said nonconductive seal (24) being formed from a ceramic material.

2. An apparatus (10A) as claimed in claim 1, further comprising:
a wetting agent means (14a) for providing plating compatibility; said wetting agent means (14a) being generally located between said lower side (12b) of said central planar layer (12) and said negative side protective layer (16b).

3. An apparatus (10A) as claimed in claim 2, in which said wetting agent (14a) is formed from copper.

4. An apparatus (10A) as claimed in claim 2, in which said wetting agent (14a) is a nickel flash.

5. An apparatus (10A) as claimed in claim 4, in which said nickel flash is generally from one to twenty microinches thick.

6. An apparatus (10A) as claimed in claim 2, in which said wetting agent (14a) is a lead-tin alloy.

7. An apparatus (10A) as claimed in claim 1, in which said central planar layer (12) is aluminum.

8. An apparatus (10A) as claimed in claim 7, in which said central planar layer (12) is iron.

9. An apparatus (10A) as claimed in claim 7, in which said central planar layer (12) is titanium.

10. An apparatus (10A) as claimed in claim 7, in which said central planar layer (12) is an aluminum alloy.

11. An apparatus (10A) as claimed in claim 1, further comprising:
a first intermediate layer (22) for protecting said central planar layer (12) during charge reversal of said lead-acid battery.

12. An apparatus (10A) as claimed in claim 11, in which said first intermediate layer (22) is lead.

13. An apparatus (10A) as claimed in claim 11, in which said first intermediate layer (22) is titanium.

14. An apparatus (10A) as claimed in claim 1, in which said central planar layer (12) is self-healing in an acidic environment.

15. An apparatus (10A) as claimed in claim 1, in which said thermodynamically instable positive side protective layer (16a) is lead.

16. An apparatus (10A) as claimed in claim 1, in which said thermodynamically instable positive side protective layer (16a) is a lead alloy.

17. An apparatus (10A) as claimed in claim 1, in which said thermodynamically instable positive side protective layer (16a) is $Ti_4O_7$.

18. An apparatus (10A) as claimed in claim 1, in which said negative side protective layer (16b) is lead.

19. An apparatus (10A) as claimed in claim 1, in which said negative side protective layer (16b) is a lead alloy.

20. An apparatus (10A) as claimed in claim 1, in which said negative side protective layer (16b) is carbon.

21. An apparatus (10A) for use in a lead-acid battery comprising:
a central planar layer (12); said central planar layer (12) having an upper (12a) and a lower (12b) side;

a pair of discrete substrate protection means (16a & 16b) for protecting said central planar layer (12) from destructive electrochemical reactions; said pair of discrete substrate protection means (16a & 16b) including a thermodynamically instable positive side protective layer means (16a);

said thermodynamically instable positive side protective layer means (16a) being located adjacent to and being securely deposited on said upper side (12a) of said central planar layer (12);

a negative side protective layer (16b);

said negative side protective layer means (16b) being located adjacent to and being securely deposited on said lower side (12b) of said central planar layer (12).

22. An apparatus (10B) for use in a lead-acid battery comprising:
a central planar layer (12); said central planar layer (12) having an upper (12a) and a lower (12b) side;

a pair of discrete substrate protection layers (18 & 16b) for protecting said central planar layer (12) from destructive electrochemical reactions; said pair of discrete substrate protection layer (18 & 16b) including a thermodynamically stable positive side protective layer means (18);

said thermodynamically stable positive side protective layer means (18) being located adjacent to and being securely deposited on said upper side (12a) of said central planar layer (12);

a negative side protective layer (16b);

said negative side protective layer (16b) being located adjacent to and being securely deposited on said lower side (12b) of said central planar layer (12).

23. An apparatus (10B) as claimed in claim 22, in which said central planar layer (12) is self-healing in an acidic environment.

24. An apparatus (10B) as claimed in claim 23, in which said central planar layer (12) is iron.

25. An apparatus (10B) as claimed in claim 23, in which said central planar layer (12) is titanium.

26. An apparatus (10B) as claimed in claim 23, in which said central planar layer (12) is an aluminum alloy.

27. An apparatus (10B) as claimed in claim 22, in which said thermodynamically stable positive side protective layer (18) is a conductive layer of metal oxide.

28. An apparatus (10B) as claimed in claim 27, in which said metal oxide is doped tin oxide.

29. An apparatus (10B) as claimed in claim 28, in which said tin oxide is doped with fluorine.

30. An apparatus (10B) as claimed in claim 22, further comprising:

a wetting agent (14a) for providing plating compatibility; said wetting agent (14a) being located between said lower side (12b) of said central planar layer (12) and said negative side protective layer (16b).

31. An apparatus (10B) as claimed in claim 30, in which said wetting agent (14a) is a nickel flash.

32. An apparatus (10B) as claimed in claim 30, in which said wetting agent (14a) is formed from copper.

33. An apparatus (10B) as claimed in claim 31, in which said nickel flash is from one to twenty microinches thick.

34. An apparatus (10B) as claimed in claim 30, in which said wetting agent (14a) is a lead-tin alloy.

35. An apparatus (10B) as claimed in claim 22, in which said thermodynamically stable positive side protective layer (18) is a semi-conductive layer of metal oxide.

36. An apparatus (10B) as claimed in claim 35, in which said semi-conductive metal oxide is doped tin oxide.

37. An apparatus (10B) as claimed in claim 22, further comprising:
a first intermediate layer (23) for protecting said central planar layer (12) from attack through defects in said thermodynamically stable positive side protective layer (18).

38. An apparatus (10B) as claimed in claim 37, in which said first intermediate layer (23) is titanium.

39. An apparatus (10B) as claimed in claim 22, in which said central planar layer (12) is aluminum.

40. An apparatus (10B) as claimed in claim 22, in which said negative side protective layer (16b) is lead.

41. An apparatus (10B) as claimed in claim 22, in which said negative side protective layer (16b) is a lead alloy.

42. An apparatus (10B) as claimed in claim 22, in which said negative side protective layer (16b) is carbon.

* * * * *